(No Model.) 3 Sheets—Sheet 1.

W. RODENBERG.
Mustard Grinding and Sifting Apparatus.

No. 243,083. Patented June 21, 1881.

Fig: 1.

Witnesses.
Henry F. Parker
John C. Tunbridge

Inventor.
William Rodenberg
by his attorney
A. v. Briesen (No Model.) 3 Sheets—Sheet 2.

W. RODENBERG.
Mustard Grinding and Sifting Apparatus.

No. 243,083. Patented June 21, 1881.

Witnesses.
Henry F. Packer
John C. Tunbridge

Inventor.
William Rodenberg
by his attorney
A v. Briesen (No Model.) 3 Sheets—Sheet 3.
W. RODENBERG.
Mustard Grinding and Sifting Apparatus.
No. 243,083. Patented June 21, 1881.
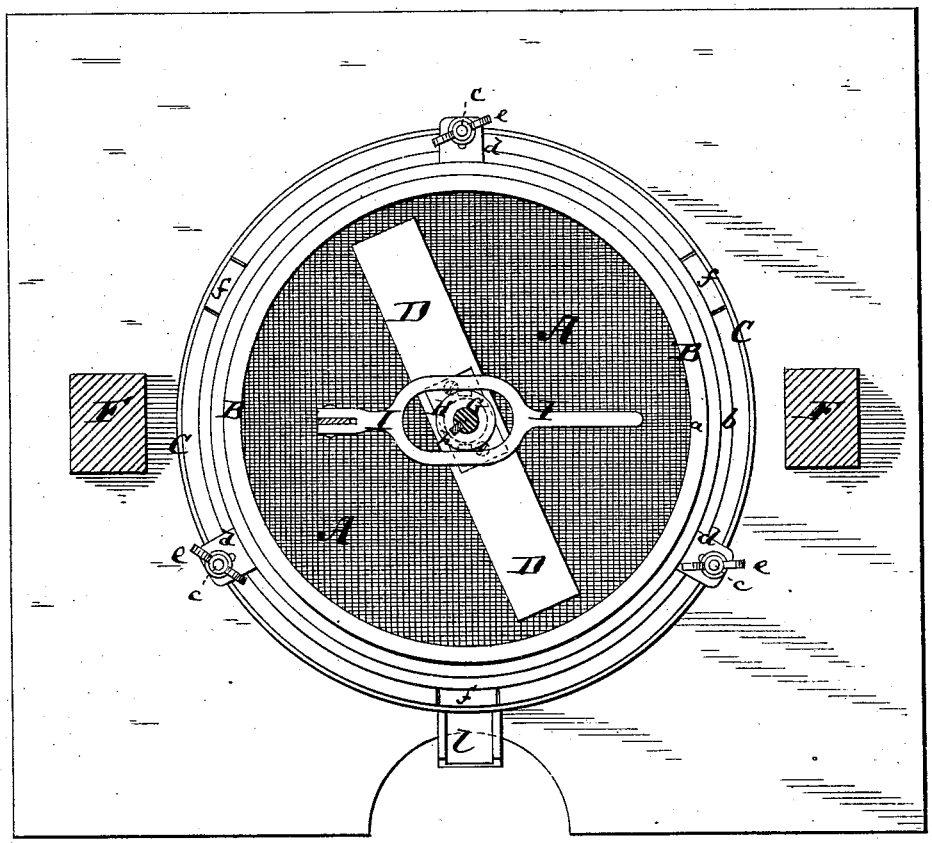
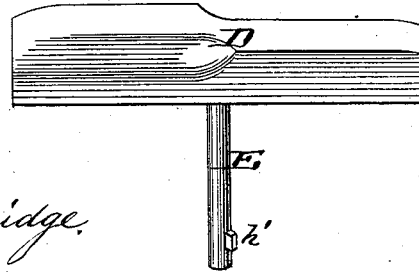
Witnesses.
Henry F. Parker
John C. Tunbridge.
Inventor:
William Rodenberg
by his attorney
A. v. Briesen

UNITED STATES PATENT OFFICE.

WILLIAM RODENBERG, OF NEW YORK, N. Y.

MUSTARD GRINDING AND SIFTING APPARATUS.

SPECIFICATION forming part of Letters Patent No. 243,083, dated June 21, 1881.

Application filed January 24, 1881. (No model.)

*To all whom it may concern:*

Be it known that I, WILLIAM RODENBERG, of the city, county, and State of New York, have invented a new and Improved Mustard Grinding and Sifting Apparatus, of which the following is a specification.

My invention relates to a new and improved apparatus for grinding mustard and forcing it through a sieve, thereby separating the kernel from the shell of the seed and preventing the heating of the mustard. When the mustard-seed is entirely ground between stones, as heretofore, the kernels and shells will become mixed and the product heated by the action of the grinding-stones, thus destroying the strength of the mustard.

Figure 1:
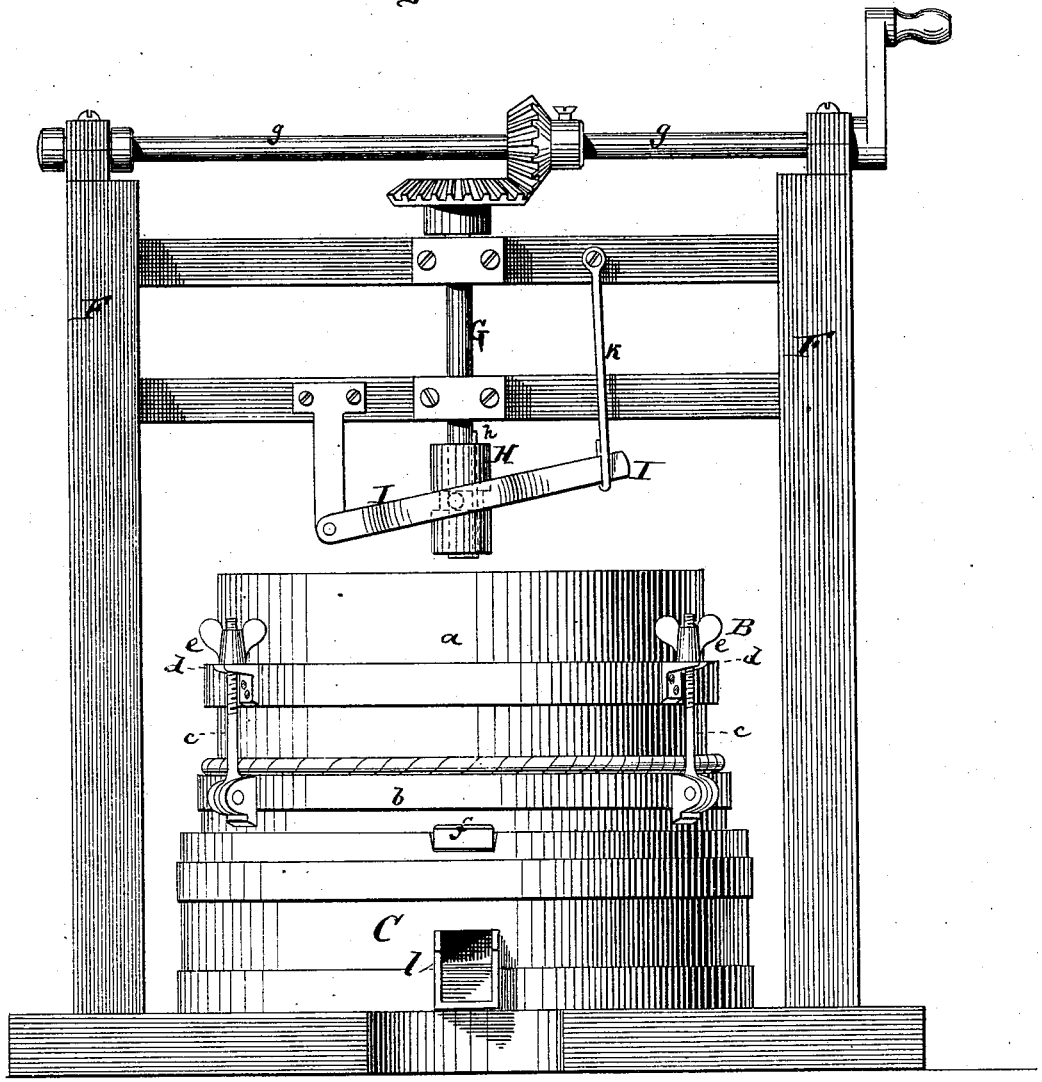
Figure 2:
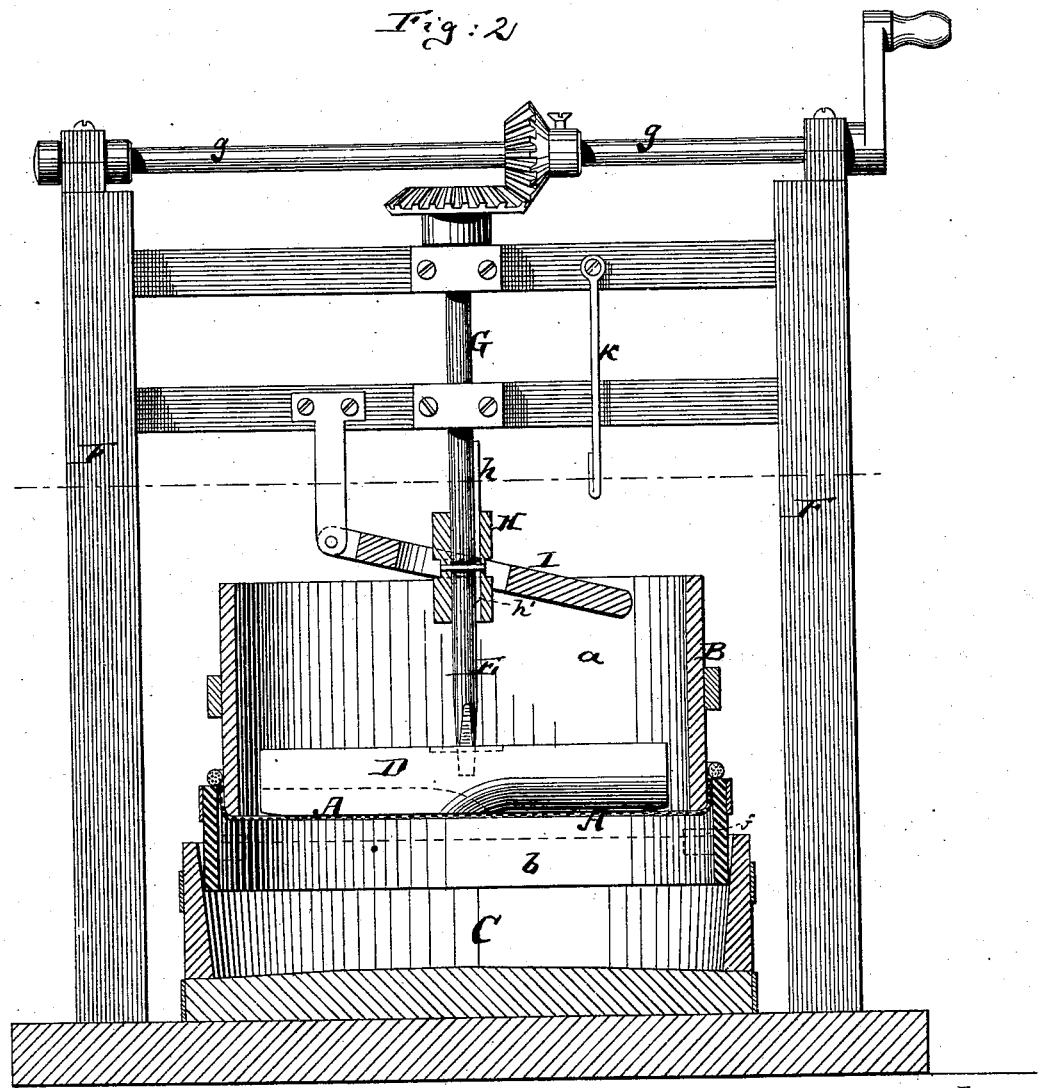

Figure 1 is a side view of my improved apparatus. Fig. 2 is a central vertical section thereof. Fig. 3 is a top view, partly in section, of the same; and Fig. 4 is a detail perspective view of the wiper.

A is a sieve, of suitable material, secured in the cylindrical body B, that consists of upper part, $a$, and lower part, $b$, and is placed over the receiver C. The sieve-body A is secured between the upper part, $a$, and the lower part, $b$, of the cylindrical body A, and can be set taut by means of screw-rods $c$, that are hinged to the lower rim, $b$, and fitted with nuts $e$, that bear on forked lugs $d$ projecting from the rim $a$, as shown in Fig. 1. The lower rim, $b$, is provided with one or more projecting lugs, $f$, which fit notches in the receiver C, so that the two parts may be properly united and yet readily detachable, all as indicated in Fig. 1.

Within the body B, and above the sieve A, is placed the wiper D, that is attached to a rotating vertical shaft, E.

Above the body B and receiver C is a suitable framing, F, which carries a power-shaft, $g$, which, by means of suitable gear-wheels, turns the vertical shaft G, which is hung in the frame F, directly above shaft E. The two shafts E G are connected by a suitable coupling-sleeve, H, which joins the projecting feathers $h\ h'$ on shafts E G, as shown in Fig. 2. The sleeve H can be lowered or raised by means of a lever, I, which is pivoted to the frame F. A hook, $k$, is fastened to any suitable part of the framing F, and serves to support the lever I when raised to uncouple the sleeve H, as in Fig. 1.

When the wiper is coupled to the shaft its pressure upon the sieve A may be increased or diminished at pleasure by pressing with greater or less force upon the lever I.

The wiper D is constructed preferably of wood, of the shape shown. That part of wiper D which acts upon the sieve A is rounded, the curves on either side beginning about the center and gradually increasing toward the ends, so that when the wiper D is revolved the substance to be ground will be taken into the open part of each side and passed to the center until it reaches the broad ungrooved part of the wiper.

When the apparatus is ready for operation the broken seeds and vinegar will be put into body B upon the sieve A, and when the wiper D is set in motion the kernels will be finely pulverized by the wiper and passed through the meshes of the sieve A into the receiver C, while the shells will remain upon the sieve, and can be removed threfrom from time to time. The product can be removed from receiver C through a chute, $l$, or other opening.

I claim—

1. In a mustard-sieve, the cylindrical body B, consisting of lower part, $b$, and upper part, $a$, in combination with the screw-rods $c$, lugs $d$, nuts $e$, and with the sieve A, substantially as herein shown and described.

2. The apparatus for grinding mustard, consisting of receiver C, cylindrical sieve-body B, sieve A, shafts E G, coupling-sleeve H, wiper D, and lever I, substantially as herein shown and described.

WILLIAM RODENBERG.

Witnesses:
WILLY G. E. SCHULTZ,
WM. H. C. SMITH.